United States Patent
Dubyak et al.

(10) Patent No.: US 10,528,660 B2
(45) Date of Patent: Jan. 7, 2020

(54) LEVERAGING WORD PATTERNS IN THE LANGUAGE OF POPULAR INFLUENCERS TO PREDICT POPULAR TRENDS

(71) Applicant: International Business Machines Corporation, Armonk, NY (US)

(72) Inventors: William G. Dubyak, Severna Park, MD (US); Joshua G. Hong, Singapore (SG); Brian L. Keith, Leesburg, VA (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 15/829,909

(22) Filed: Dec. 2, 2017

(65) Prior Publication Data
US 2019/0171706 A1 Jun. 6, 2019

(51) Int. Cl.
| | | |
|---|---|---|
| G06F 3/00 | (2006.01) | |
| G06Q 50/00 | (2012.01) | |
| G06Q 30/02 | (2012.01) | |
| G06F 17/27 | (2006.01) | |

(52) U.S. Cl.
CPC .......... *G06F 17/271* (2013.01); *G06F 17/277* (2013.01); *G06Q 30/0201* (2013.01); *G06Q 50/01* (2013.01)

(58) Field of Classification Search
CPC .............................. G06Q 30/00; G06Q 20/00
See application file for complete search history.

(56) References Cited

U.S. PATENT DOCUMENTS

| | | | |
|---|---|---|---|
| 7,197,470 B1 | 3/2007 | Arnett et al. | |
| 8,312,056 B1 | 11/2012 | Peng et al. | |
| 8,650,492 B1 * | 2/2014 | Mui ...................... | H04L 43/045 |
| | | | 715/736 |
| 8,856,056 B2 | 10/2014 | DiSciullo et al. | |

(Continued)

OTHER PUBLICATIONS

Beheshti-Kashi, Sarnaneh, et al., "The Usage of Social Media Text Data for the Demand Forecasting in the Fashion Industry", chapter in "Dynamics in Logistics", pp. 723-727, Springer International Publishing (2016).

(Continued)

*Primary Examiner* — Shreyans A Patel
(74) *Attorney, Agent, or Firm* — William J. Stock; Jack V. Musgrove

(57) ABSTRACT

Popular trends are predicted by leveraging the language of influencers as found in their electronic publications such as social media, blogs, etc. A list of influencers in a given field is curated along with a lexicon of the field which includes product names and associated modifiers. Natural language processing is performed on the current publications to identify a particular word combination based on syntactic relationships. The current usage frequency of the particular word combination is compared to a historical usage frequency derived from a baseline. If the current usage frequency is significantly higher, an alert is generated indicating that the particular word combination represents a candidate trend. The word combination may be a syntactic n-gram. The current usage frequency is based on a first, recent time window, and the historical usage frequency is based on a second time window preceding the first time window.

20 Claims, 5 Drawing Sheets

(56) References Cited

U.S. PATENT DOCUMENTS

| | | | |
|---|---|---|---|
| 9,218,392 B1* | 12/2015 | Zgraggen | G06F 16/9535 |
| 2004/0215726 A1* | 10/2004 | Arning | G06F 17/276 |
| | | | 709/206 |
| 2011/0078045 A1* | 3/2011 | Tuflija | G06Q 20/10 |
| | | | 705/26.64 |
| 2012/0259882 A1* | 10/2012 | Thakur | G06Q 30/0625 |
| | | | 707/767 |
| 2013/0085803 A1 | 4/2013 | Mauro et al. | |
| 2015/0012331 A1 | 1/2015 | Carter et al. | |
| 2017/0060963 A1* | 3/2017 | Whittaker | G06F 16/25 |
| 2018/0268015 A1* | 9/2018 | Sugaberry | G06N 3/063 |

OTHER PUBLICATIONS

Beheshti-Kashi, Samaneh, et al., "Fashion Supply Chains and Social Media: Examining the Potential of Data Analysis of Social-Media Texts for Decision Making-Processes in Fashion Supply Chains" ABSTRACT, chapter in Business Models and ICT Technologies For The Fashion Supply Chain, Springer International Publishing, pp. 271-281 (2016).

Fisher, Hendrick, "Food stylists' food image creation for print media and consumer intepretation: an exploratory investigation", University of Pretoria University of Pretoria Dept. of Consumer Science (2014).

He, Wu, et al., "Social media competitive analysis and text mining: A case study in the pizza industry", Int'l. Journal of Information Mangament, v. 33, pp. 464-472 (2013).

IP.COM, "Unsupervised detection of representative reviewers from Product reviews," publication No. IPCOM000232660D (2013).

Kaplan, Andreas, et al., "Users of the world, unite! The challenges and oppurtunities of Social Media", Business Horizons Journal, v. 53, n. 1, pp. 59-68 (2010).

Khan, Khairullah, et al., "Mining opinion components from unstructured revies: A review" Journal of King Saud University, v. 26, n. 3, pp. 258-275 (2014).

Sidorov, Grigori, et al., "Syntactic N-grams as Machine Learning Features for Natural Language Processing", Journal of Expert Systems with Applications, vol. 41, n. 3, pp. 853-860 (2014).

* cited by examiner

54

"I welcomed the autumn season with a pork chop dish that uses a cranberry sauce to bring out the subtle ..."
2017-10-30; 14:52:41

"The Bordeaux has only the slightest hint of grapefruit ..."
2017-11-12; 21:33:14

"A translucent slow-poached quail egg, pickled in champagne vinegar, rests on a tiny nest ..."
2017-11-15; 12:42:38

"The biggest crowd favorite seemed to be the rack of lamb drenched with sweet arbol chile glaze ..."
2017-11-09; 09:16:25

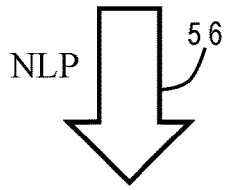

NLP 56

58

| Product Keyword | Modifier(s) |
|---|---|
| "pork chop" | "cranberry" |
| "Bordeaux" | "grapefruit" |
| "quail egg" | "champagne vinegar" |
| "lamb" | "sweet", "chile de arbol" |

FIG. 3

LEVERAGING WORD PATTERNS IN THE LANGUAGE OF POPULAR INFLUENCERS TO PREDICT POPULAR TRENDS

BACKGROUND OF THE INVENTION

Field of the Invention

The present invention generally relates to natural language processing, and more particularly to a method of monitoring and analyzing the communications of influencers in a field to identify potential product trends.

Description of the Related Art

Predictive modeling is a well-established methodology across a diverse problems space. For example, impending mechanical failure of a complex system such as a diesel generator can be predicted by application of failure models to performance data streaming in real time. Collaborative and cooperative filters enable recommendation of consumer products to users based on retailer knowledge of prior consumer spending.

Other events are less conducive to prediction. For example, there is a cottage industry to predict commercial success of a new song, movie or book. While there is no doubt that previous commercial success of an artist suggests a ready audience for subsequent work (a new John Grisham novel often debuts as #1 on the New York Times bestseller list), much of this prediction is left to intuition of people with enormous depth in the industry. This approach is hardly scientific.

Other trends or fads can be detected on social media. A trending Twitter subject can be an indicator of enormous commercial success in the near term ("OMG, you simply MUST try x"). This source, however, is not useful in prediction or preparation; once the subject is trending on Twitter or Instagram the popularity wave is already cresting.

Although there is ample discussion of social media analytics, there is a very limited body of work on the use of media communications to predict medium term trend setting in the market place. The article "Fashion Supply Chains and Social Media: Examining the Potential of Data Analysis of Social-Media Texts for Decision Making-Processes in Fashion Supply Chains" by Beheshti-Kashi et al. considers the impact of blog posts on color choices by retail store buyers and customers. Their work suggests a strong relationship between blog posts and choices made by buyers for retail stores. Interestingly, their work also finds that blog information corresponds with real world customer demand. H. J. Fisher, in a master's thesis entitled "Food stylists' food image creation for print media and consumer interpretation: an exploratory investigation", investigated the psychometric connections between choices made by professional food stylists and consumer food choice. He finds that food stylists, through non-verbal communication, can create images in print media that have the impact of altering consumer behavioral intent and eventual purchasing decisions. The paper "Social Media Competitive Analysis and text mining: A case study in the pizza industry" by He et al. (focused mainly on retail-level social media like Facebook) notes that more than half the people responding to a consumer survey by Market Force Information chose food options by reviewing online comments and reviews.

As analysis of social media becomes more complex, it is increasingly important to have a set of tools that provide a more intuitive understanding of user communications. As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand. Examples of an advanced computer systems that use natural language processing include virtual assistants, Internet search engines, and deep question answering systems such as the Watson™ cognitive technology marketed by International Business Machines Corp.

Deep question answering systems can identify passages from text documents (corpora) and analyze them in various ways in order to extract answers relevant to a query; answers can be scored on a number of factors, and the highest score indicates the "best" answer. Models for scoring and ranking the answer are trained on the basis of large sets of question and answer pairs.

One method of analyzing a natural language sentence is to construct a parse tree for the sentence. As the name suggests, a parse tree is a tree-like construct having branches and nodes (including a root node, interior or non-terminal nodes, and leaf or terminal nodes) whose arrangement and elements reflect the syntax of the input language. Syntax generally pertains to rules that govern the structure of sentences, particularly word order. Syntax is one set of rules that make up the grammar of a language. Grammar includes additional rules such as morphology and phonology. Syntax can help define relations between words in a statement, such as a noun being associated with an adjective or a prepositional phrase.

One aid in NLP involves the use of syntactic n-grams. An n-gram is a sequence of n items from text or speech (two items is a bi-gram, three items a tri-gram, etc.). Syntactic n-grams are n-grams defined by paths in syntactic dependency or constituent trees rather than the linear structure of the text. The paper "Syntactic N-grams as Machine Learning Features for Natural Language Processing" by Sidorov et al. promotes the use of syntactic n-grams over regular n-grams. Words in the n-gram are determined by syntactic relations in a parse tree rather than physical word order lifted directly from the text. This preserves "real" relations between words in a sentence, and lifts arbitrary constraints imposed by surface sentence structure.

SUMMARY OF THE INVENTION

The present invention in at least one embodiment is generally directed to a method of identifying a potential product trend in a consumer field by monitoring electronic media over time for current electronic publications of influencers in the field, performing natural language processing on the current publications to identify a particular word combination which has one product name and one or more modifiers based on a lexicon provided for the field, determining that a current usage frequency of the particular word combination is greater than a historical usage frequency derived from a historical baseline of word combinations, and responsively generating an alert indicating that the particular word combination represents a candidate trend. The natural language processing can identify the particular word combination based on a syntactic relationship between a particular product name and its modifiers, such as the word combination being a syntactic n-gram. The historical baseline can be based on occurrences of the word combinations from previous electronic publications of the influencers. In an exemplary implementation, to avoid spurious alerts the current usage frequency must be greater than a predetermined multiple of the historical usage frequency, and must also be greater than a sum of the historical usage frequency and a predetermined threshold value. The current usage frequency is based on a first time window, e.g., of no more than six months from the current date, and the historical usage frequency is based on a second time window preceding the first time window, e.g., of at least twelve months. Influencers can be selected based on different criteria, particularly geographic region.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

FIG. 3 is a sample data collection from different influencers in the food industry and creation of particular word combinations using natural language processing in accordance with one implementation of the present invention;

The use of the same reference symbols in different drawings indicates similar or identical items.

DESCRIPTION OF THE PREFERRED EMBODIMENT(S)

Figure 1:
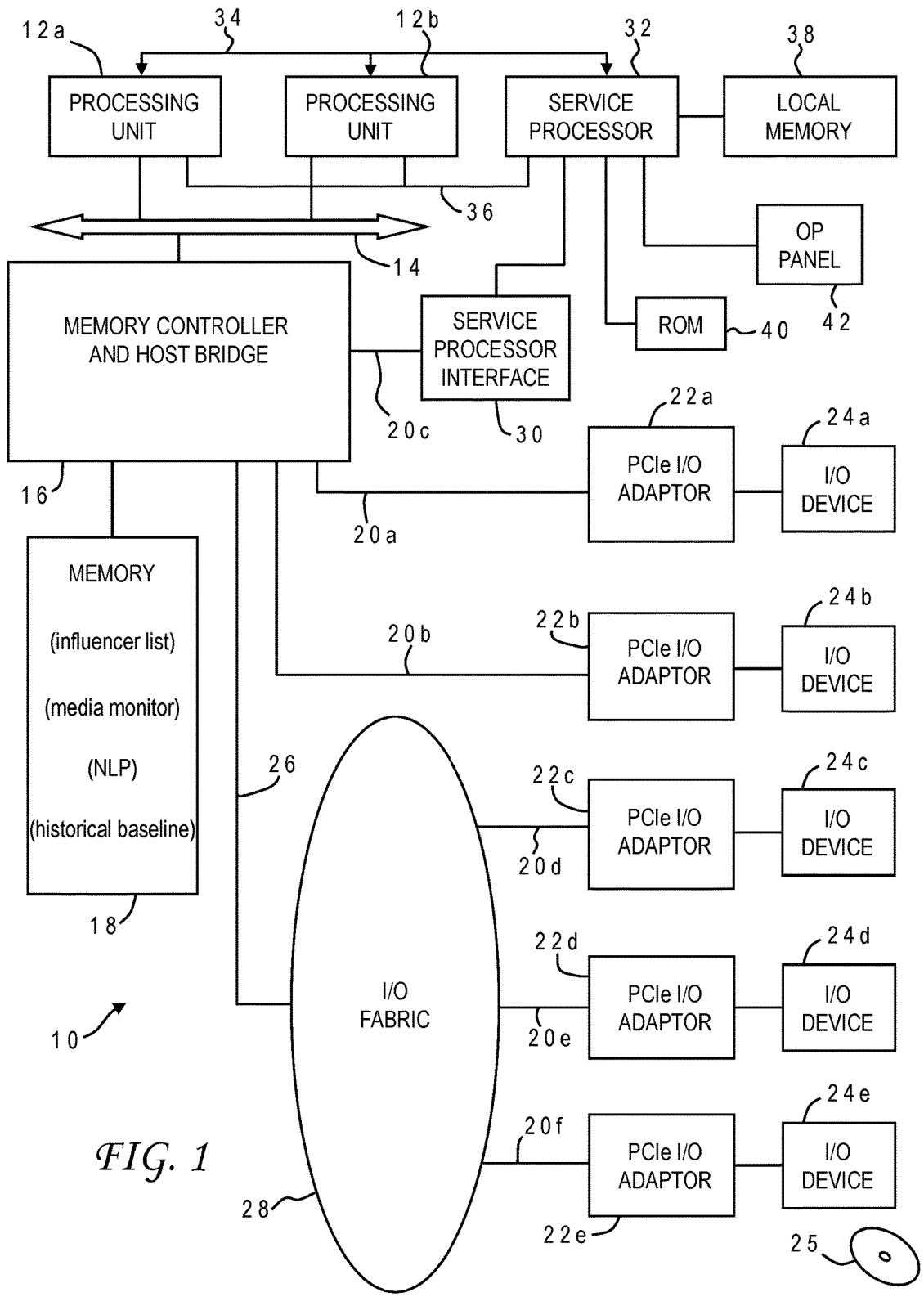
FIG. 1 is a block diagram of a computer system programmed to carry out predictive analysis of consumer trends in accordance with one implementation of the present invention.

Predicting new consumer trends is difficult for a variety of reasons. Desired data sources are inherently noisy, and a core requirement is a very large dataset spanning a considerable time period. Candidate detection search space is inherently large and sparse—there are no detectable clustering characteristics, although over time and with the right amount of data, precision over categories can be defined. Because of the sparseness of the data, standard forecasting/prediction methods such as ARIMA (Autoregressive Integrated Moving Average) models or ETS (Error, Trend, Seasonal) models are difficult to apply.

Part of the requirement for using predictive models with a time dimension is a steady time series of values taken at equally distant time intervals, which is impossible in the context of social media. It would, therefore, be desirable to devise an improved method of predicting consumer trends that are not especially conducive to prediction by standard analytics methods. It would be further advantageous if the method could offer early indications of an impending peak in popularity for a product, providing sufficient warning for manufacturers and retailers to prepare for increased consumer demand.

The present invention in various implementations meets these and other objectives by using natural language processing to extract certain word combinations from influencers' publications based on a product lexicon, and the compares a current usage frequency of a given word combination to a historical baseline. If the current usage frequency is significantly greater than the baseline, an alert can be generated to flag the word combination as a candidate product trend.

The method of the present invention can be generalized to predict any type of consumer trend. For purposes of explanation this disclosure uses the food industry as an exemplar but this topic should not be construed in any limiting sense. Food is a particularly useful example because it gets ample exposure through electronic media, particularly social media such as Instagram, Twitter, Facebook, etc., which can be automatically monitored by a computer system. The set of thought leaders, bloggers, industry influencers whose work is generally available in this case would include food critics for the local paper, food bloggers, columnists, etc. A lexicon of common food/flavor/ingredient names is generated as a source for the patterns. These names will be common ingredients or food product items such as beef, chicken, ice cream, eggs, etc. A list of sample modifiers for the product names is used to seed the process of syntactic n-gram extraction. Statistical entity and n-gram extraction, along with the cumulative nature of trend tracking according to the present invention, enable this functionality without excessive overhead. A historical baseline from the influencer list is also generated with corresponding time stamps. Food/flavor combinations are rarely truly novel so establishing a baseline is important. Ongoing monitoring of the published output of the influencer list (with corresponding time stamps) allows automatic detection of words on the source list, and extraction of every mention with adjacent combinations. The frequency of each extracted combination is noted, and when a marked increase is found for a particular combination over a relatively narrow time window (compared against baseline), it can be flagged for review by human experts.

Automatic detection and discovery of trend candidates from raw textual data on this scale is not possible today. Great human effort is required to do retrospective searching and curation, and that effort spent still does not allow for the wide perspective and aperture needed to identify trending items prior to mainstream awareness. Identifying a trend prior to mainstream awareness can provide companies with a competitive edge and lead time in bringing the appropriate offering to market.

With reference now to the figures, and in particular with reference to FIG. 1, there is depicted one embodiment 10 of a computer system in which the present invention may be implemented to carry out predictive analysis of consumer trends. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications and/or data modules in accordance with the present invention, such as natural language processing, a historical baseline of word combinations, a list of available sources for influencers, and a monitor for such media.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the predictive analysis program of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a predictive analysis process that uses novel natural language techniques to identify candidate trends. Accordingly, a program embodying the invention may additionally include conventional aspects of various NLP tools, and these details will become apparent to those skilled in the art upon reference to this disclosure.

Figure 2:
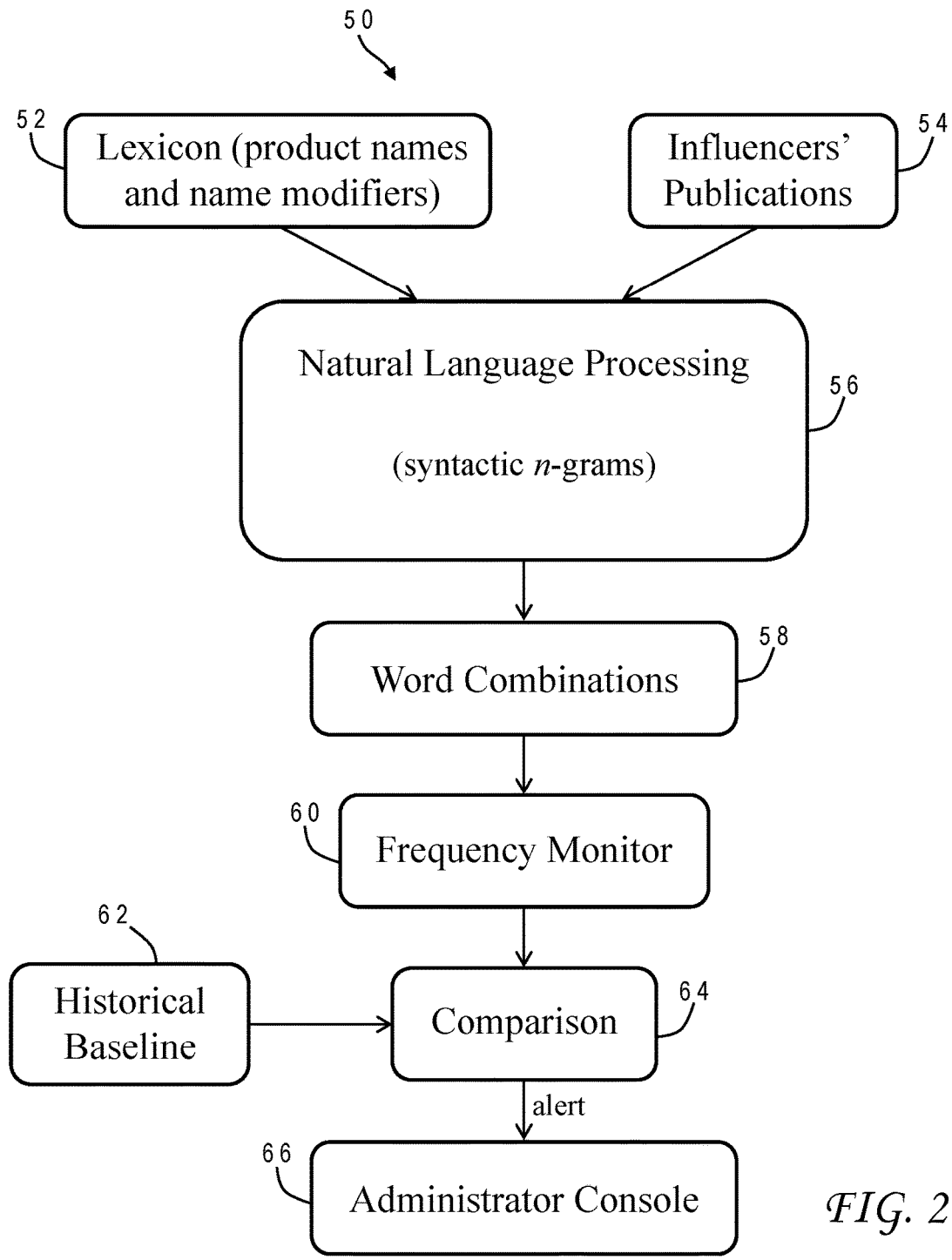
FIG. 2 is a high-level block diagram of an analysis system for monitoring publications of industry influencers for certain word combinations to determine when a candidate trend is appearing in accordance with one implementation of the present invention.

Referring now to FIG. 2, there is depicted a high-level representation 50 of a predictive analysis system for identifying candidate consumer trends in accordance with one implementation of the present invention. System 50 is given a lexicon 52 for the particular product field which is the subject of the analysis. Lexicon 52 includes product names or keywords, and potential modifiers for those product names. Lexicon 52 may be created by one or more subject matter experts. In the food arena, lexicon 52 includes primary ingredient variants (steak, chicken, salmon, bananas, etc.). Since even a cursory look at food trends indicates broad coverage of ingredients, this list should be comprehensive. A product name can itself be more than one word, not considered as any modifier, like "potato chip" or "pork chop".

System 50 monitors electronic media for publications 54 from a set of known influencers for the particular product field which is the subject of the analysis. The publications may include unstructured textual data. The sources of publications 54 may vary considerably. They can include web-based social media, blogs, etc., of the influencers themselves, or can be third-party (host) sites which the influencers may utilize, such as a restaurant review enterprise like Zomato. The cognitive system implementing the natural language processing used in the present invention can identify the names of reviewers to figure out that a particular review was generated by a known influencer. While the electronic media monitored is primarily from Internet sources, it could include other sources and even services that can electronically scan hard copy printouts to yield computer-readable information. Influencers can be anyone in a position of authority on the subject matter, including industry leaders, bloggers, newspaper critics, subject matter reviewers, periodical authors, and others having a high social profile in the field. The original list of influencers is preferably based on geographic boundaries (e.g., country, region, or state) as well as subject (e.g., food), and possibly based on subtopics (e.g., vegan or beverages).

A natural language processing system 56 (such as IBM's Watson) receives influencer publications 54 and automatically identifies word combinations therein pertaining to lexicon 52 based on syntactic relationships. It is virtually impossible to come up with a fully comprehensive dictionary of all possible word combinations in a field, in part because the standard rules-based technique falls apart with colloquialisms ("freek shake") and longer descriptors with filler words ("cheese fries WITH ranch dressing AND A SIDE OF mash"). The goal with syntactic relations is to eventually create (with enough data from a defined domain) a model that predicts the type of syntactic relationships expected, which can then be used to perform extractions.

The number of allowable modifiers for a product name can vary according to implementation. Empirical evidence suggests that mentions of foods made popular by such influencers will follow a general language pattern, where the name of a food will be adjacent to 1-3 modifiers. The invention can leverage work on syntactic n-grams, allowing NLP system 56 to detect relationships between key ingredient mentions and their modifiers regardless of word choices by influencers. Thus, if a word pattern is found as a syntactic n-gram and that n-gram has one product name according to the lexicon and 1-3 modifiers according to the lexicon, it becomes a word combination whose usage is recorded. This is an especially important feature in the earliest stages of trend emergence, when individual influencers may not have agreed on a standard reference to a new combination of flavors.

As particular word combinations 58 are discovered in influencer publications 54, their usage frequency can be computed by a monitor 60, e.g., how many times that word combination appears per month. The time window for current usage frequency can vary according to implementation. For example, current usage frequency may be based on the number of times a particular word combination appears over the last 2 months or over the last 6 months. A comparator 64 analyzes the current usage frequency in light of a historical usage frequency from a baseline 62. The time window for the historical usage can also vary, e.g., over the 12 months preceding the last 2 months, or over the last 24 months. The two time windows (current and historical) can overlap or can be mutually exclusive. The frequency comparison may consider multiple baseline time windows. Comparator 64 may allow for partial matches of word combinations, like just the two words "pork" and "salty" appearing together regardless of other modifiers (sub segmentation).

If the current usage frequency for a particular word combination is significantly higher than the historical baseline for that combination, an alert is generated informing an administrator 66 of a candidate trend. The determination of when current usage frequency is sufficiently higher than the baseline can also vary according to implementation. For example, a doubling of the usage frequency may be considered insufficient to generate an alert, but if the current usage frequency is more than ten times greater (or some other predetermined multiplier) than the historical frequency than a trend can be assumed. The system designer may want to avoid spurious alerts when the historical baseline shows a very small usage for some word combination and the current usage is comparatively higher but still not particularly significant, so may require that the absolute increase in usage is still above some predetermined threshold value. The breakout candidates can then go through further due diligence by product development or marketing teams.

Figure 4:
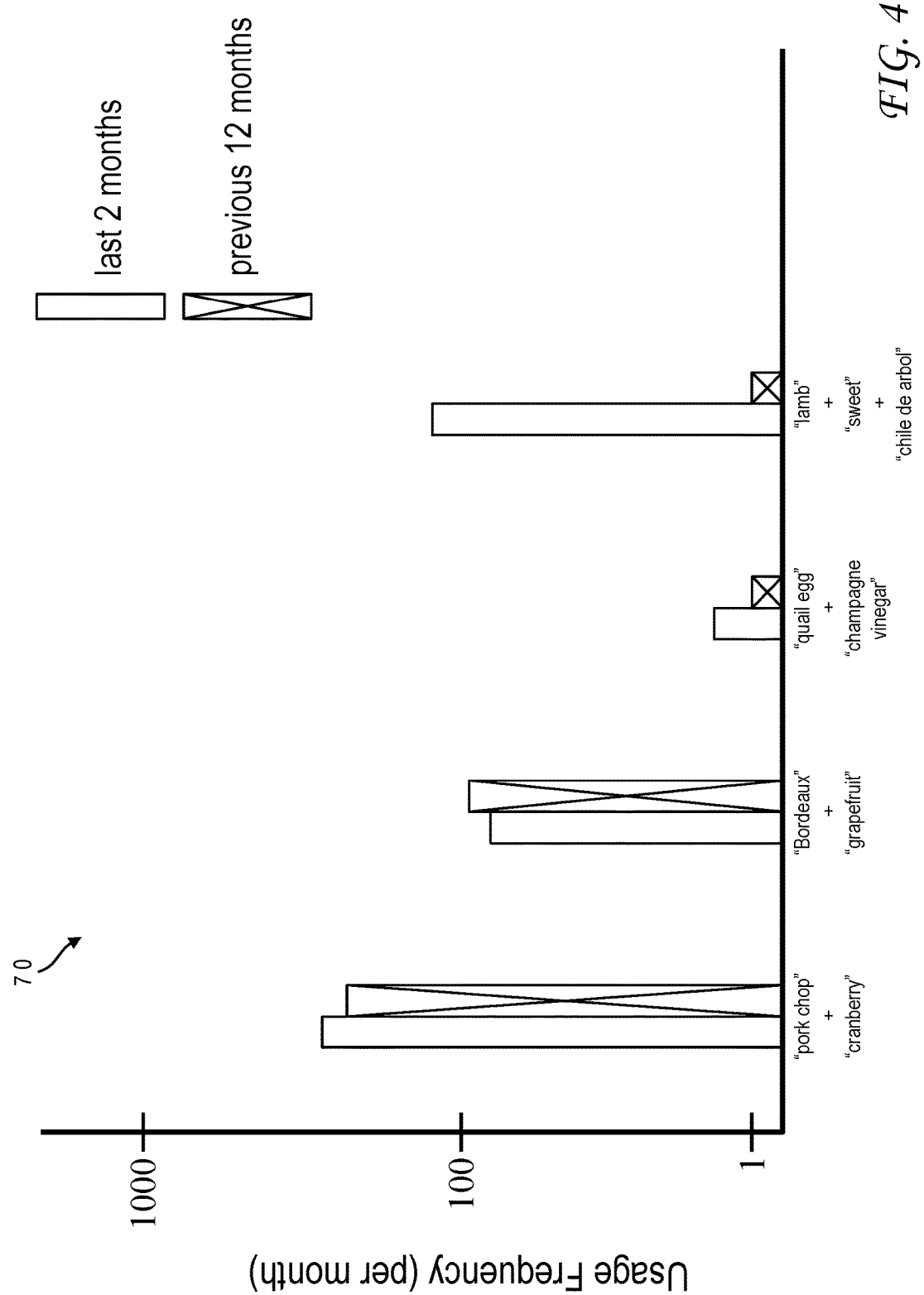
FIG. 4 is a bar chart showing current and historical usage frequencies for the sample word patterns of FIG. 3 in accordance with one implementation of the present invention.

FIG. 3 illustrates an example of four statements from various influencer publications 54 that might be encountered when trying to predict a trend in fine dining. Each publication has a corresponding time stamp. Parsing these statements yields the following word combinations: "pork chip" with "cranberry"; "Bordeaux" with "grapefruit"; "quail egg" with "champagne vinegar"; and "lamb" with "sweet" and "chile de arbol" (the term according to lexicon 52, which is equated to the phrase "arbol chile" in the influencer statement). Each occurrence of a word combination is recorded with its corresponding timestamp. FIG. 4 shows how these word combinations might be analyzed in comparison to the historical baseline. Current usage frequency of the word combination "pork chop" plus "cranberry" is only slightly higher than historical usage, and not deemed to indicate any trend. Current usage frequency of the word combination "Bordeaux" plus "grapefruit" is slightly lower than historical usage, and also not deemed to indicate any trend. Current usage frequency of the word combination "quail egg" plus "champagne vinegar" (three per month) is more than double the historical usage (one per month), but the absolute number of occurrences is still small so not deemed to indicate any trend. Current usage frequency of the word combination "lamb" with both "sweet" and "chile de arbol" is roughly one hundred times higher than historical usage, so this word combination is flagged for further review as a likely trend.

The invention thereby enhances and extends the judgement of human experts in a field where experience is an essential element in trend prediction. It automatically extracts and flags for inspection sudden changes in popularity and discussion of an item by influencers in a field. Leveraging this impact can help manufacturers and distributors reliably predict the timing and intensity of market peaks ahead of general market awareness.

Figure 5:
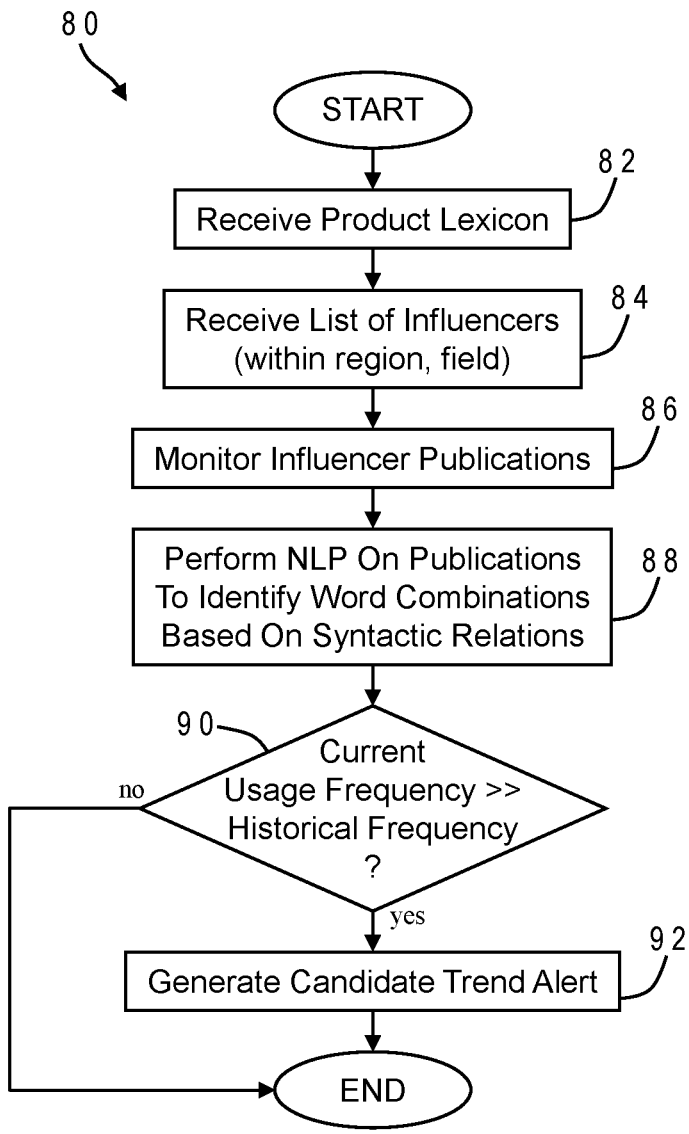
FIG. 5 is a chart illustrating the logical flow for a consumer trend prediction process in accordance with one implementation of the present invention.

The present invention may be further understood with reference to the chart of FIG. 5 which illustrates the logical flow for a consumer trend prediction process 80. Process 80, which may be carried out on computer system 10, begins by receiving the product lexicon (82) and receiving the list of influencers or electronic media sources (84). The cognitive system monitors the influencer publications (86), and performs NLP on those publications to identify particular word combinations based on syntactic relationships (88). A determination is then made as to whether the current usage frequency of any identify word combination is significantly greater than the historical frequency obtained from the baseline (90). If so, the alert is generated to flag a candidate trend (92).

Understanding and anticipating changes in consumer trends is central to most companies' continued successful growth and development. The present invention allows companies to understand the developing trends in a given market ahead of the curve. The system can continually process and update fresh results as new data is available, identifying breakout trend candidates that have a strong probability of gaining a disproportionate share of the consumer mindshare. The present invention scales this solution so that a comprehensive range of influencers can be monitored in near real time, and sudden changes in frequency of discussion referred to human experts for possible action.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described in the context of the food industry but it is applicable to any product, not just goods but services as well. It is therefore contemplated that such modifications can be made without departing from the spirit or scope of the present invention as defined in the appended claims.

What is claimed is:

1. A method of identifying a potential product trend in a consumer field comprising:
   receiving a lexicon of product names and name modifiers for the consumer field, by executing first instructions in a computer system;
   receiving a historical baseline of word combinations wherein a given word combination includes one of the product names associated with one or more of the modifiers, by executing second instructions in the computer system;
receiving a list of influencers in the consumer field, by executing third instructions in the computer system;
monitoring electronic media over time for current electronic publications of the influencers, by executing fourth instructions in the computer system;
performing natural language processing on the current electronic publications to identify a particular one of the word combinations, by executing fifth instructions in the computer system;
determining that a current usage frequency of the particular word combination is greater than a historical usage frequency of the particular word combination derived from the historical baseline, by executing sixth instructions in the computer system; and
responsively generating an alert indicating that the particular word combination represents a candidate trend, by executing seventh instructions in the computer system.

2. The method of claim 1 wherein the natural language processing identifies the particular word combination based on a syntactic relationship between a particular product name in a particular one of the current electronic publications and one or more particular modifiers in the particular publication.

3. The method of claim 2 wherein the particular word combination is a syntactic n-gram extracted from the particular publication according to a set of parsing rules.

4. The method of claim 1 further comprising generating the historical baseline based on occurrences of the word combinations from previous electronic publications of the influencers.

5. The method of claim 1 wherein said determining establishes that the current usage frequency is greater than a predetermined multiple of the historical usage frequency, and establishes that the current usage frequency is greater than a sum of the historical usage frequency and a predetermined threshold value.

6. The method of claim 1 wherein the current usage frequency is based on a first time window of no more than six months from the current date, and the historical usage frequency is based on a second time window of at least twelve months preceding the first time window.

7. The method of claim 1 further comprising making preparations for increased consumer demand of a product indicated by the candidate trend.

8. A computer system comprising:
one or more processors which process program instructions;
a memory device connected to said one or more processors; and
program instructions residing in said memory device for identifying a potential product trend in a consumer field by receiving a lexicon of product names and name modifiers for the consumer field, receiving a historical baseline of word combinations wherein a given word combination includes one of the product names associated with one or more of the modifiers, receiving a list of influencers in the consumer field, monitoring electronic media over time for current electronic publications of the influencers, performing natural language processing on the current electronic publications to identify a particular one of the word combinations, determining that a current usage frequency of the particular word combination is greater than a historical usage frequency of the particular word combination derived from the historical baseline, and responsively generating an alert indicating that the particular word combination represents a candidate trend.

9. The computer system of claim 8 wherein the natural language processing identifies the particular word combination based on a syntactic relationship between a particular product name in a particular one of the current electronic publications and one or more particular modifiers in the particular publication.

10. The computer system of claim 9 wherein the particular word combination is a syntactic n-gram extracted from the particular publication according to a set of parsing rules.

11. The computer system of claim 8 wherein said program instructions further generate the historical baseline based on occurrences of the word combinations from previous electronic publications of the influencers.

12. The computer system of claim 8 wherein the determining establishes that the current usage frequency is greater than a predetermined multiple of the historical usage frequency, and establishes that the current usage frequency is greater than a sum of the historical usage frequency and a predetermined threshold value.

13. The computer system of claim 8 wherein the current usage frequency is based on a first time window of no more than six months from the current date, and the historical usage frequency is based on a second time window of at least twelve months preceding the first time window.

14. The computer system of claim 8 wherein the influencers are all within a predefined geographic region.

15. A computer program product comprising:
a computer readable storage medium; and
program instructions residing in said storage medium for identifying a potential product trend in a consumer field by receiving a lexicon of product names and name modifiers for the consumer field, receiving a historical baseline of word combinations wherein a given word combination includes one of the product names associated with one or more of the modifiers, receiving a list of influencers in the consumer field, monitoring electronic media over time for current electronic publications of the influencers, performing natural language processing on the current electronic publications to identify a particular one of the word combinations, determining that a current usage frequency of the particular word combination is greater than a historical usage frequency of the particular word combination derived from the historical baseline, and responsively generating an alert indicating that the particular word combination represents a candidate trend.

16. The computer program product of claim 15 wherein the natural language processing identifies the particular word combination based on a syntactic relationship between a particular product name in a particular one of the current electronic publications and one or more particular modifiers in the particular publication.

17. The computer program product of claim 16 wherein the particular word combination is a syntactic n-gram extracted from the particular publication according to a set of parsing rules.

18. The computer program product of claim 15 wherein said program instructions further generate the historical baseline based on occurrences of the word combinations from previous electronic publications of the influencers.

19. The computer program product of claim 15 wherein the determining establishes that the current usage frequency is greater than a predetermined multiple of the historical usage frequency, and establishes that the current usage frequency is greater than a sum of the historical usage frequency and a predetermined threshold value.

20. The computer program product of claim 15 wherein the current usage frequency is based on a first time window of no more than six months from the current date, and the historical usage frequency is based on a second time window of at least twelve months preceding the first time window.

\* \* \* \* \*